United States Patent [19]

Marcantonio

[11] Patent Number: 4,544,533
[45] Date of Patent: Oct. 1, 1985

[54] RECOVERING VANADIUM VALUES FROM AMMONIUM BICARBONATE SOLUTION USING HEAT, SULFURIC ACID, AND AMMONIUM SULFATE

[75] Inventor: Paul J. Marcantonio, San Rafael, Calif.

[73] Assignee: Chevron Research Company, San Francisco, Calif.

[21] Appl. No.: 674,816

[22] Filed: Nov. 26, 1984

[51] Int. Cl.$^4$ ............................................. C01G 31/00
[52] U.S. Cl. ...................................... 423/67; 423/63; 423/593; 75/101 BE
[58] Field of Search ..................... 423/62, 63, 67, 593; 75/101 BE, 121

[56] References Cited

U.S. PATENT DOCUMENTS

| | | |
|---|---|---|
| 3,083,085 | 3/1963 | Lewis et al. ............................ 423/54 |
| 4,344,924 | 8/1982 | Lucas et al. ............................ 423/67 |
| 4,434,140 | 2/1984 | Hubred et al. ......................... 423/63 |
| 4,434,141 | 2/1984 | Hubred et al. ......................... 423/63 |
| 4,442,074 | 4/1984 | Hubred et al. ......................... 423/63 |
| 4,514,369 | 4/1985 | Hubred et al. ......................... 423/63 |

Primary Examiner—H. T. Carter
Attorney, Agent, or Firm—S. R. LaPaglia; W. K. Turner; V. J. Cavalieri

[57] ABSTRACT

A method of recovering vanadium from an aqueous ammonium bicarbonate solvent strip solution is disclosed. The method includes heating the aqueous ammonium bicarbonate solution at a temperature of from 70° C. to 100° C., followed by addition of sulfuric acid to control the pH in the range of from 6.5 to 8.5 and addition of ammonium sulfate to precipitate out the vanadium.

7 Claims, 2 Drawing Figures

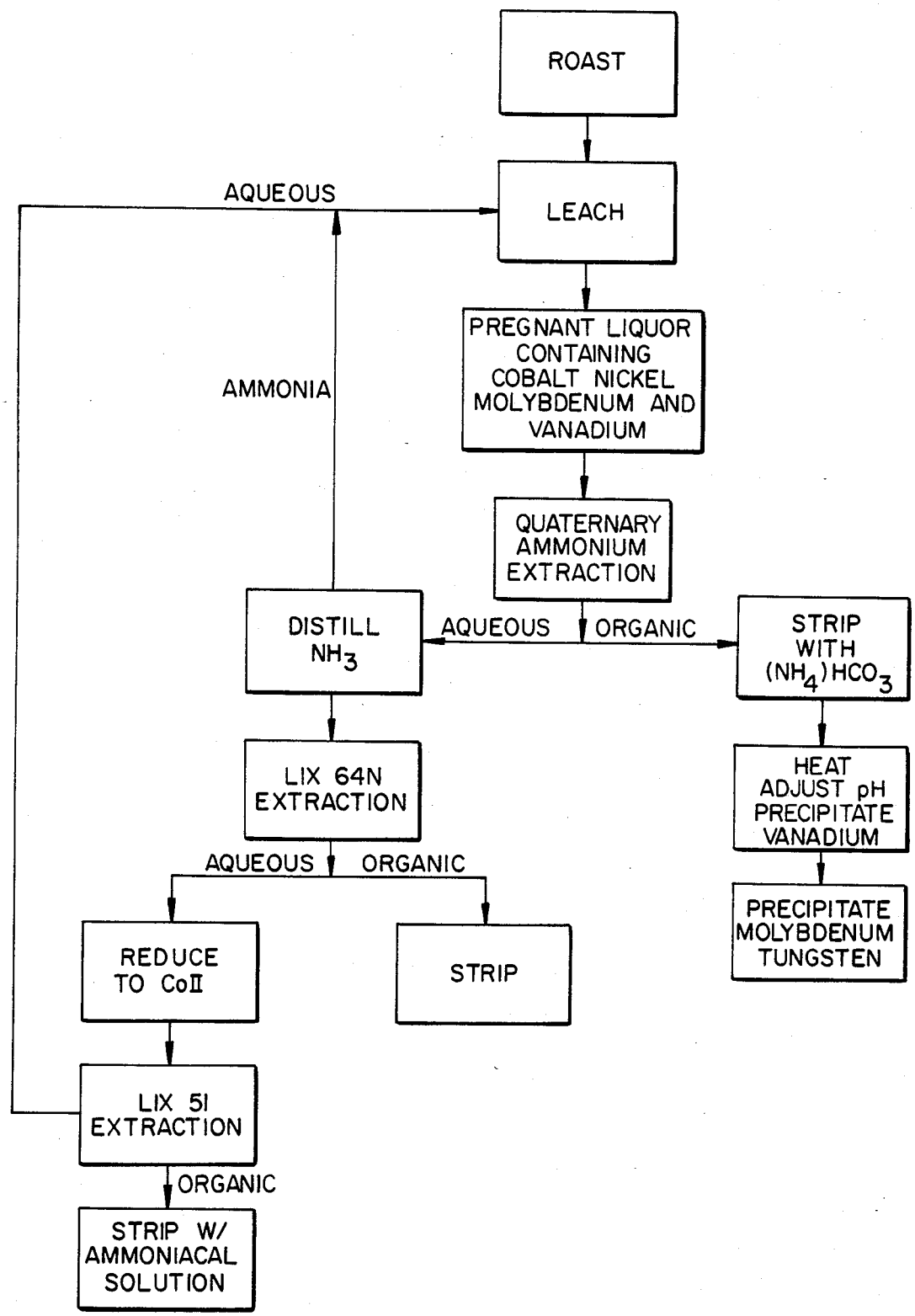
FIG._1.

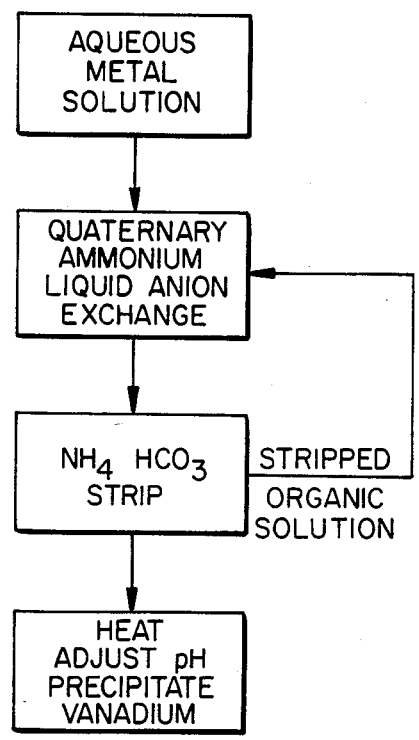
FIG._2.

RECOVERING VANADIUM VALUES FROM AMMONIUM BICARBONATE SOLUTION USING HEAT, SULFURIC ACID, AND AMMONIUM SULFATE

BACKGROUND OF THE INVENTION

This invention relates to a method of recovering vanadium values from aqueous solutions. More particularly, this invention relates to a method of recovering vanadium values from an aqueous ammonium bicarbonate solution.

A number of important hydrometallurgical processes involve the extraction of metal species in the form of anionic metal complexes from aqueous pregnant liquors, subsequent stripping of the metal values from the organic phase into an aqueous phase and finally separation of the metal values from the aqueous phase. Such extracting and stripping processes are especially important in the hydrometallurgy of Group VB and Group VIB metals. One particularly important source of aqueous pregnant liquors containing both Group VB and Group VIB metal values is the pregnant liquor produced from leaching spent hydroprocessing catalysts.

The chemistry of Group VB and Group VIB metals in aqueous solution is particularly complex. Each metal in both groups forms a variety of oxidation states that can in turn form a variety of oxygen-containing anions in aqueous solution. These metal-oxygen complexes undergo complex reactions in aqueous solution that depend on such variables of pH, temperature, concentration and chemical environment. Each metal of the Group VB and Group VIB undergoes reactions at unique conditions. The complex aqueous chemistry of Group VB and Group VIB metals makes the liquid-liquid phase transfer processes particularly difficult, especially if more than one metal species of Group VB and Group VIB are present.

Crude oils frequently contain metals, particularly iron, nickel, tungsten and vanadium. Spend hydroprocessing catalysts that have been in contact with metals containing crude or residual oil can therefore contain both molybdenum, a frequent catalytic metal, tungsten and vanadium. Extracting and stripping these metal values when any one is present alone, or simultaneously when mixtures of the metals are present from a leach liquor from spent catalysts therefore presents a difficult and subtle problem.

It is preferred, that if the metals from catalysts are to be recovered by hydrometallurgical techniques, that the total flow scheme be one that allows maximum recycle of reagents and minimum introduction of extraneous ions. Since one preferred recovery system as described in U.S. Pat. Nos. 4,434,141; 4,434,140 and 4,442,074 involves an aqueous ammoniacal leach using ammonium carbonate or ammonium sulfate, it is preferred that only ammonia, ammonium ion, carbonate or sulfonate ion be added to the aqueous streams. This self-imposed limitation complicates the recovery scheme of Group VB and Group VIB metals even more.

It is possible, at pH values in the range of about 3 to about 5, to extract Group VB and Group VIB metals when any one is present alone, or simultaneously when present as mixtures thereof, and particularly, molybdenum, tungsten and vanadium, into an organic phase by use of a quaternary amine as a liquid anion exchange reagent. One such reagent is tri-caprylyl methyl ammonium chloride, which is sold under the trade name Aliquat 336 ® by the Henkel Chemical Company.

Aliquat 336 ® and related compounds that have extracted constituents from Group VB and Group VIB on them tend to be difficult to strip, especially if the strip is to be chemically compatible with the leach. In U.S. Pat. No. 3,083,085 an aqueous solution of NaCl is used to strip molybdenum from the organic phase. This requires regeneration of the organic extracting solution with sulfuric acid and the use of expensive alloys in process equipment that are not corroded by chloride ion.

U.S. Pat. No. 3,083,076 discloses the use of an aqueous solution of both sodium sulfate and sodium hydroxide to strip molybdenum and vanadium from the organic solution. Again, this strip is chemically incompatible with the leach and requires corrosion resistant process equipment.

U.S. Pat. Nos. 4,434,140, and 4,434,141 disclose the use of an aqueous solution of bicarbonate anion as being particularly effective for stripping both Group VB and Group VIB metals particularly vanadium, molybdenum and tungsten from organic solutions containing quaternary ammonium compounds. Bicarbonate provides high recoveries under mild conditions and is chemically compatible with the ammoniacal leach step in an overall process to recover metal values from spent hydroprocessing catalysts. Hydrochloric acid is added to the aqueous bicarbonate strip solution and ammonium metavanadate is precipitated. The resulting aqueous solution may contain either molybdenum or tungsten or no metals at all. The molybdenum or tungsten can be recovered by reducing the volume of the solution until the metals start to precipitate. The precipitation can be aided by adding an appropriate ion to form a less soluble salt, for example, calcium hydroxide may be added to precipitate the less soluble calcium molybdate.

There is a problem with the use of hydrochloric acid to precipitate out the vanadium metal values since chloride ion is corrosive to process equipment and may cause chemical complications in downstream processes such as incompatible chloride complexes which may not be extractable in solvent extraction.

It has been discovered that vanadium may be precipitated from the aqueous ammonium bicarbonate strip solution by heating the ammonium bicarbonate strip solution in order to decompose the ammonium bicarbonate and to boil off $NH_3$ and $CO_2$ which may be recovered and adding ammonium sulfate to the solution. The solution is acidified, preferably with sulfuric acid to maintain the pH of the solution in the range of from 6.5 to 8.5 and preferably 7.0 to 7.5 wherein ammonium vanadate precipitates out of solution. This process eliminates the use of chloride ion which is corrosive to the process equipment.

SUMMARY OF THE INVENTION

In its broadest embodiment, this invention provides a method of recovering vanadium values from an aqueous ammonium bicarbonate solvent extraction strip solution comprising: (a) heating the aqueous ammonium bicarbonate strip solution containing vanadium values to a temperature of from 70° C. to 100° C. in order to decompose the ammonium bicarbonate to $NH_3$ and $CO_2$; (b) distilling $NH_3$ and $CO_2$ from the aqueous solution; (c) adding $H_2SO_4$ to the strip solution in order to bring the pH of the strip solution in the range of from 6.5 to 8.5; (d) adding ammonium sulfate to the solution to a total concentration of from about 0.2M to 10M and preferably 0.2M to 1M; (e) separating the vanadium metal values from the strip solution.

In another embodiment, this invention provides an improvement over the method described in U.S. Pat. No. 4,434,140 which is incorporated herein by reference, which teaches a method of stripping an organic extraction solvent containing a metal quaternary alkyl ammonium complex wherein said metal is selected from the group consisting of vanadium, alone or in combination with one or more of the remaining Group VB or Group VIB metals, preferably molybdenum and tungsten or mixtures thereof comprising:

contacting said organic extraction solvent with an aqueous stripping solution maintained at a temperature of no more than 50° C., a pH between 7 and 9, and containing at least 75 grams per liter of a salt of a bicarbonate ion, preferably ammonium bicarbonate, for a time sufficient to convert said metal quaternary alkyl ammonium complex or mixtures thereof to an aqueous soluble metal complex; separating said organic extraction solvent and said aqueous stripping solution. This prior art method then treats the aqueous stripping solution with hydrochloric acid to precipitate out the vanadium in the form of ammonium metavanadate. The molybdenum and/or tungsten if present in the resulting aqueous solution can be recovered by reducing the volume of the solution until the metals start to precipitate.

The improvement of the instant invention resides in the elimination of hydrochloric acid and the use of heat, addition of sulfuric acid and ammonium sulfate and control of the pH to precipitate out the vanadium in the form of ammonium metavanadate from the aqueous bicarbonate solution as described above.

BRIEF DESCRIPTION OF THE DRAWING

FIG. 1 shows a flow scheme for an embodiment of this invention.

FIG. 2 shows in detail the flow scheme of this invention.

DETAILED DESCRIPTION

As world oil reserves dwindle, more heavy oil, with high concentrations of metals and sulfur, must be refined. One process, in the refining of such metals containing oil, is to contact the oil with hydroprocessing catalysts to remove metals and sulfur. After a period of time, these catalysts do not give desired product quality and must be replaced. These used catalysts are herein defined as spent catalyst. Spent catalysts, from demetalation service, have relatively high amounts of metals deposited on their surface and also contain catalytic metals.

Metals removed from crude oils are typically iron, nickel, vanadium and tungsten, and catalytic metals are generally molybdenum, cobalt, tungsten or nickel. The metals can be leached simultaneously from spent catalyst that has been roasted to remove carbonaceous and sulfurous residues. An excellent leach system for spent catalyst is an aqueous solution of ammonia and ammonium salt as disclosed in U.S. Pat. Nos. 4,434,141, 4,434,140 and 4,442,074, which are incorporated herein by reference. The pregnant liquor from the leach can be divided into two fractions: an aqueous solution of ammine complexes of the cationic metals, for example, nickel and cobalt, and an aqueous solution of anionic metal oxide ions, such as molybdates, tungstates and vanadates or mixtures thereof.

Vanadium alone, or in combination with any one or more of other Group VB or Group VIB metals, such as molybdenum or tungsten or mixtures thereof, can be removed by liquid-anion exchange extraction techniques, using quaternary ammonium compounds as the extracting agent. Vanadium alone or in combination with any of the other Group VB and Group VIB metals such as molybdenum or tungsten can be extracted and stripped simultaneously. The quaternary ammonium compounds of this invention can be made by the general method of U.S. Pat. No. 3,083,085.

The extraction can be carried out directly on a pregnant liquor from an ammonia and ammonium salt leach solution. This solution typically has a pH of about 10 to 10.5. The preferred organic extractant are quaternary ammonium compounds of the general formula $RR'_3N^+Cl^-$, where R is methyl and R' is a group ranging from $C_8$ to $C_{12}$. Such organic extractants are sold by Henkel Chemical Corporation under the trade name Aliquat 336 ® and by Sherex Chemical Company, under the trade name of Adogen 464 ®, and obtainable from Aldrich Chemical as an impure compound of methyl tricaprylyl ammonium chloride.

The quaternary ammonium compounds are in organic solution, preferably in hydrocarbon solutions, for example, kerosene, which may be conditioned by a paraffinic alcohol such as decanol. Contacting the aqueous phase with the anion exchange reagent extracts the vanadium and any other Group VB or Group VIB metal such as molybdenum. The reaction can be generically depicted as:

$$MA^{y-} + (y/x)R_xA \rightarrow R_yMA + A^{x-}$$

where x and y are small whole numbers, typically between 0 and 10, and M is any Group VB or VIB metal oxyanion, and R can be any organic substituent that makes the quaternary amine sufficiently hydrophobic. It is preferred that the organic phase consists of from 5 to 15 volume percent quaternary ammonium compound, 2 to 10 volume percent of modifier with the remainder being kerosene or fuel oil.

Stripping and Recovering Vanadium, Molybdenum and Tungsten Values

The metals are then stripped from the organic phase into an aqueous phase by an aqueous solution of ammonium bicarbonate solution. Since bicarbonate is the singly protonated form of a polyprotic acid, pH control of the strip solution becomes critical. The preferred pH range is 6.5 to 8.5, more preferably 7.0 to 7.5.

The ammonium bicarbonate is a temperature sensitive compound that can easily degrade to ammonia, carbon dioxide, and water. It has been found that, in the system of the present invention, stripping of the loaded organic solution is favored at lower temperatures and preferably in the range of 0° C. to 50° C. It is preferred that the temperature never go above about 50° C. and more preferably that the temperature not go above 25° C.

Bicarbonate ion will be present in at least 100 grams per liter and preferably in at least 75 grams per liter in the stripping solution. It is known that the more concentrated the stripping agent in the stripping solution, the more metal is extracted. Therefore, the optimum concentration for the practice of this invention is saturation.

The stripping solution will be in contact with the organic for a period of time sufficient to convert the metal quaternary alkyl ammonium complexes in the organic solution to aqueous soluble metal complexes. The two solutions are then separated by means known in the art.

Vanadium can be recovered from the aqueous ammonium bicarbonate solution by heating the aqueous solution at a temperature in the range of from 70° C. to 100° C., preferably from 85° C. to 95° C. in order to decompose the ammonium bicarbonate and distill out of the solution $NH_3$ and $CO_2$. It is an important aspect of the invention that $CO_2$ be driven out of the solution and preferably to less than 2,000 ppm in order to facilitate the precipitation of vanadium from the solution. If left in solution the $CO_2$ in the form of carbonate or bicarbonate will form soluble vanadium complexes. Sulfuric acid is added to the aqueous solution and the pH is adjusted to be in the range of from 6.5 to 8.5, and preferably from 7.0 to 7.5. Ammonium sulfate is added to the solution to a total concentration of from 0.2M to 10M and preferably 0.2M to 1M to take advantage of the common ion effect in which the additional ammonium ions further decreases the solubility of ammonium metavanadate.

The temperature of the aqueous solution is lowered to a temperature of from 20° C. to 30° C. to increase the extent of vanadium precipitation. The precipitated ammonium metavanadate is then filtered and collected. Precipitation of vanadium is further optimized by adding seed crystals of ammonium metavanadate.

The resulting aqueous solution may contain either other Group VB or VIB metal, preferably molybdenum or tungsten or mixtures thereof or no metals at all. The molybdenum or tungsten can be recovered by reducing the volume of the solution until the metals start to precipitate. The precipitation can be aided by adding an appropriate ion to form a less soluble salt, for example, calcium hydroxide may be added to precipitate the less soluble calcium molybdate.

DETAILED DESCRIPTION OF THE DRAWING

FIG. 1 illustrates an embodiment of this invention. Shown is a total flow scheme for recovering metals from spent catalyst known to contain cobalt, nickel, tungsten, molybdenum and vanadium. The catalyst is first roasted under conditions where the temperature is controlled to less than 600° C. The spent roasted catalyst is then leached at 90° C., until cobalt values in solution start to decrease. The pregnant liquor is then extracted with a quaternary amine, forming a first set of two streams: an organic stream containing molybdenum, tungsten and vanadium, and an aqueous stream containing cobalt and nickel. The first organic stream is stripped by the process of this invention with an aqueous solution of ammonium bicarbonate. The aqueous solution is heated to a temperature of 95° C. and ammonia and $CO_2$ is distilled from the solution. Sulfuric acid is added to the aqueous solution in a sufficient amount to bring the pH of the solution in the range of 7.0 to 7.5 and from 0.2M to 1M of ammonium sulfate is added. The ammonia metavanadate is precipitated. The remaining solution is further processed for the removal of molybdenum and tungsten.

Ammonia is removed by distillation from the first aqueous stream, to bring the pH down to 9.5 to about 7.5 in order to facilitate the nickel and cobalt extraction. The solution, which is exposed to air insuring that cobalt is in the trivalent oxidation state, and therefore not extractable is contacted with LIX 64N ® an hydroxyoxime, extracting the nickel and creating a second set of two streams: an aqueous containing cobalt and any impurities and an organic containing nickel. The second organic solution is stripped with sulfuric acid, forming an acidic nickel containing sulfate solution. The cobalt in the second aqueous stream is reduced over cobalt metal, and extracted with LIX 51 ® a fluorinated beta-diketone, thereby forming a third set of aqueous and organic streams.

The third aqueous stream is recycled to the leach step, enriched in ammonia recovered from the ammonia distillation step. The third organic stream is stripped with a solution of ammonia and ammonium carbonate or sulfuric acid.

FIG. 2 shows another embodiment of the strip of this invention. An aqueous solution containing vanadium ions, and optionally including other Group VB and Group VIB metal oxide anions, is contacted with a quaternary ammonium liquid anion reagent. The resulting organic metal containing solution is stripped by an aqueous solution of ammonium bicarbonate. The stripped organic solution can then be recycled without having had any extraneous ions placed into it by the strip solution. The result is an aqueous metal solution containing vanadium and any of the other Group VB and Group VIB metal values which may be present such as molybdenum and tungsten. The aqueous solution is heated to a temperature of 95° C. and ammonia and $CO_2$ is distilled from solution. Sulfuric acid is added to the aqueous solution in sufficient amount to bring the pH of the solution in the range of 7.0 to 7.5 and ammonium sulfate in the range of from 0.2M to 1M is added to the solution. The ammonium metavanadate is precipitated.

The following example is presented in further illustration of the invention.

EXAMPLE

A spent catalyst containing Co, Mo, Ni and V was roasted and then leached with an ammoniacal ammonium carbonate solution. The pregnant liquor was contacted with a quaternary amine solution to extract the oxyanions of molybdenum and vanadium. These metals were then stripped from the organic with a saturated (2.5M) solution of ammonium bicarbonate. This solution was then divided into three parts, each part being heated and/or boiled to a different degree of severity to drive off different amounts of $CO_2$. This was done to determine the effect of residual amounts of carbonate in the precipitation of vanadium as ammonium metavanadate.

After heating the solutions, ammonium sulfate was added to 0.5M concentration to take advantage of the common ion effect. Samples taken at 3 hours and 20 hours after cooling showed that vanadium continued to precipitate as $CO_2$ was expelled from the system.

| | Effect of Heating on Vanadium Precipitation from Ammonium Carbonate Solution | | | | | |
|---|---|---|---|---|---|---|
| Sample | 60° C. | | 75° C. (~5 min. boiling) | | 93° C. (~13 min. boiling) | |
| Time | (0 min. boiling) | | | $CO_2$, | | $CO_2$, |
| Hrs. | V, ppm | $CO_2$, ppm | V, ppm | ppm | V, ppm | ppm |
| 0 | 2,840 | 114,100 | 2,840 | 114,100 | 2,840 | 114,100 |
| 3 | 2,637 | 12,100 | 846 | 6,000 | 61 | 1,500 |

-continued

Effect of Heating on Vanadium Precipitation from Ammonium Carbonate Solution

| Sample Time Hrs. | 60° C. (0 min. boiling) | | 75° C. (~5 min. boiling) | | 93° C. (~13 min. boiling) | |
|---|---|---|---|---|---|---|
| | V, ppm | $CO_2$, ppm | V, ppm | $CO_2$, ppm | V, ppm | $CO_2$, ppm |
| 20 | 114 | 4,700 | 61 | 3,450 | <18 | 65 |

What is claimed is:

1. A method of recovering vanadium values from an aqueous ammonium bicarbonate solvent extraction strip solution comprising:
   (a) heating the aqueous ammonium bicarbonate strip solution containing vanadium values to a temperature of from 70° C. to 100° C. in order to decompose the ammonium bicarbonate to $NH_3$ and $CO_2$;
   (b) distilling $NH_3$ and $CO_2$ from the aqueous solution;
   (c) adding sulfuric acid to the strip solution in order to bring the pH of the strip solution in the range of from 6.5 to 8.5;
   (d) adding ammonium sulfate to the solution to a total concentration of 0.2M to 10M; and
   (e) separating the vanadium metal values from the strip solution.

2. The method of claim 1 wherein the temperature of the strip solution of step (a) is in the range of from 75° C. to 90° C.

3. The method of claim 1 wherein the pH of the strip solution of step (b) is in the range of from 7 to 8.

4. The method of claim 1 wherein the ammonium sulfate concentration is in the range of 0.2M to 1M.

5. The process of claim 1 wherein ammonium metavanadate seed crystals are added after step (d) in order to facilitate vanadium precipitation.

6. The process of claim 1 wherein the $CO_2$ concentration of step (b) in the solution is less than 2,000 ppm.

7. The method of claim 1 wherein the temperature of step (d) is in the range of from 20° C. to 30° C.

* * * * *